(12) United States Patent
Nett et al.

(10) Patent No.: US 9,303,754 B2
(45) Date of Patent: Apr. 5, 2016

(54) CLUTCH ASSEMBLY WITH DEOILING UNIT

(71) Applicant: GKN Driveline Köping AB, Köping (SE)

(72) Inventors: Hans-Peter Nett, Adenau (DE); Jan Haupt, Kürten (DE)

(73) Assignee: GKN Driveline Koping AB, Koping (SE)

( * ) Notice: Subject to any disclaimer, the term of this patent is extended or adjusted under 35 U.S.C. 154(b) by 0 days.

(21) Appl. No.: 14/346,778

(22) PCT Filed: Sep. 25, 2012

(86) PCT No.: PCT/EP2012/068872
§ 371 (c)(1),
(2) Date: Mar. 24, 2014

(87) PCT Pub. No.: WO2013/045444
PCT Pub. Date: Apr. 4, 2013

(65) Prior Publication Data
US 2014/0231209 A1    Aug. 21, 2014

(30) Foreign Application Priority Data

Sep. 30, 2011 (EP) .................................. 11183510

(51) Int. Cl.
*F16H 57/04* (2010.01)
*F16D 25/12* (2006.01)

(52) U.S. Cl.
CPC ............ *F16H 57/0447* (2013.01); *F16D 25/12* (2013.01); *F16H 57/0424* (2013.01); *F16H 57/0457* (2013.01); *F16H 57/0473* (2013.01); *F16H 57/0483* (2013.01)

(58) Field of Classification Search
None
See application file for complete search history.

(56) References Cited

U.S. PATENT DOCUMENTS 5,884,738 A    3/1999  Joslin et al.
6,327,935 B1  12/2001  Joslin et al.
(Continued)

FOREIGN PATENT DOCUMENTS

DE    102007022182    11/2008
DE    10 2008 002 844 A1    11/2009
(Continued)

OTHER PUBLICATIONS

International Preliminary Report on Patentability, dated Apr. 1, 2014 in PCT/EP2012/068872.
(Continued)

*Primary Examiner* — Erin D Bishop
(74) *Attorney, Agent, or Firm* — Bejin Bieneman PLC (57) ABSTRACT

The invention relates to a clutch assembly of a motor vehicle, in particular to a clutch-controlled differential unit, having a switchable clutch device which can transmit the drive power from a drive element which is at the drive input side in relation to the clutch device to a drive element which is at the drive output side in relation to the clutch device, wherein an oil delivery device is provided for the oil lubrication of the clutch, which oil delivery device, in an operating-state-dependent manner, delivers oil of an oil circuit which serves the clutch device. The clutch assembly is mounted in a housing which forms a clutch chamber for the clutch device. In order to permit rapid deoiling of the clutch chamber in situations in which the clutch device is opened, a deoiling device is provided which actively deoils the clutch chamber when the deoiling unit is not imparting a delivery action.

16 Claims, 3 Drawing Sheets

(56) References Cited

U.S. PATENT DOCUMENTS

| | | |
|---|---|---|
| 6,345,712 B1 | 2/2002 | Dewald et al. |
| 6,474,444 B1 | 11/2002 | Mochizuki |
| 6,615,966 B2 | 9/2003 | Kato |
| 8,215,440 B2 | 7/2012 | Hoffmann et al. |
| 8,428,838 B2 | 4/2013 | Kondo et al. |
| 2002/0033314 A1 | 3/2002 | Kato |
| 2004/0224809 A1 | 11/2004 | Hayes et al. |
| 2009/0277711 A1 | 11/2009 | Hoffmann |
| 2010/0274456 A1 | 10/2010 | Kondo et al. |
| 2011/0143878 A1* | 6/2011 | Juenemann et al. .......... 475/220 |

FOREIGN PATENT DOCUMENTS

| | | |
|---|---|---|
| EP | 0875690 A2 | 11/1998 |
| EP | 0875690 A3 | 2/2000 |
| EP | 1191258 A2 | 3/2002 |
| EP | 0875690 B1 | 9/2003 |
| EP | 2116411 | 11/2009 |
| EP | 2116411 A1 | 11/2009 |
| EP | 2243653 A2 | 10/2010 |
| JP | H10311404 A | 11/1998 |
| JP | 2002098171 A | 4/2002 |
| JP | 2007010003 A | 1/2007 |
| JP | 2008014368 A | 1/2008 |
| JP | 2009269605 A | 11/2009 |
| JP | 2010260383 A | 11/2010 |
| WO | 2010017881 | 2/2010 |

OTHER PUBLICATIONS

International Search Report dated Nov. 20 2012, in PCT/EP2012/068872.

Korean Patent Office First Office Action dated Jun. 17, 2015 (w/ English translation; 8 pages).

Chinese Patent Office First Office Action dated Dec. 1, 2015 (w/ English translation; 10 pages).

* cited by examiner

CLUTCH ASSEMBLY WITH DEOILING UNIT

CROSS-REFERENCE TO RELATED APPLICATIONS

This application claims priority to, and is a National Phase of, International Application No. PCT/EP2012/068872, filed on Sep. 25, 2012, which in turn claims priority to European Patent Application No. 11183510.4, filed on Sep. 30, 2011, which applications are hereby incorporated by reference in their entirety.

BACKGROUND

A clutch assembly of a motor vehicle is arranged to transmit drive power of the motor vehicle to a wheel of an axle. The clutch assembly includes a clutch device that can be engaged and disengaged, and that can transmit drive power from a first drive member to a second drive member. The first drive member is on the drive side of the clutch device. The second drive member is on the output side of the clutch device. An oil-delivering device is provided to oil the clutch. The oil-delivering device delivers oil of an oil circuit serving the clutch device depending on an operating state. The clutch device is mounted in a housing which forms a clutch space for accommodating the clutch device.

The clutch assembly may be part of a clutch-controlled equalisation unit, by which wheels of an axis can be integrated into the flow of drive power, or decoupled from the same, in order to be able to operate a vehicle in all-wheel drive or two-axle drive, or in two-wheel drive or single-axle drive, as desired.

A clutch assembly of this type is known from EP 2 116 411 A1. In a clutch-controlled equalisation unit, a clutch assembly is provided with an activatable multiple disc clutch for a side shaft, which forms a drive member on the output side of the clutch device. Drive power is directed via the multiple disc clutch to the connected drive wheel of a motor vehicle as required. The outer disc carrier of the multiple disc clutch, which can be coupled to the drive-side shaft or to the output-side drive member, delivers lubricating and cooling oil into an oil pan provided in a housing of the clutch assembly, from which the oil flows back into a sump formed by the clutch space, is picked up again by the clutch, and is fed back to the circuit. An inner oil circuit is thereby formed in relation to a disc pack of a side shaft clutch.

Because of this inner oil circuit, a large proportion of oil used for cooling and lubrication remains for a long time in the described inner oil circuit without the oil volume being sufficiently mixed with, or replaced with, "fresh" oil. The oil volume that has only just absorbed heat between the clutch discs is fed directly back to the discs. The clutch temperature therefore increases over-proportionately to the cooling effect that would be achievable with the oil quantity present in the equalisation unit. The over-proportionate heating of the clutches is disadvantageous in terms of the wear behaviour and thus the service life, as well as in terms of the response and control behaviour.

A further disadvantage of the configuration disclosed in EP 2 116 411 A1 is that the clutch packs of the side shaft clutches are in the oil continuously in order to pick it up and deliver it to the oil collection pocket. The associated splash losses increase the power loss of the drive train.

With regard to the undesirable power loss, it is also the case, even in the case described in EP 2 116 411 A1, that, where the secondary part of the drive train is decoupled from the drive wheels and the side shaft clutches are completely open, the secondary drive wheels roll on the road in driving mode and drag a clutch disc carrier and the discs connected in a rotationally fixed manner thereto. The discs, however, are in constant contact with the oil, because they dip therein. Not only is the region of the extremely narrow air gap (gap width approximately 0.1 mm) between the inner and outer discs, which is situated directly in the oil, filled with oil, but the oil is also conveyed into the interspace, not in the oil, between the inner and outer discs of the multiple disc clutch by the rotating discs. The liquid friction or hydrodynamic friction produced as a result in turn transmits drag torque acting on the inner discs from the secondary drive wheels to the outer discs, thereby driving the outer discs. However, as soon as the outer discs begin to rotate, they in turn convey oil into the above-described inner oil circuit, and thus increase the oil volume conveyed, and therefore likewise again increase the friction and power loss. The undesirable effect intensifies by itself to a certain extent.

Experiments have shown that, because of this effect, the secondary drive train is not immobilised even when decoupled from the primary part of the drive train, in contrast to the assumptions made in EP 2 116 411 A1. The negative consequences of this effect can be reduced only slightly by the low-friction design of the surfaces of the inner discs proposed in EP 2 116 411 A1. Moreover, low-friction surfaces of the inner discs result in a much poorer response and control behaviour of the clutch pack. This disadvantage outweighs the power loss advantages that can be achieved with this measure.

Given this background, a clutch assembly of the type mentioned in the introduction, is desirable to avoid the above-described disadvantages. E.g., For example, it is desirable to optimise the oiling concept described in EP 2 116 411 A1 with the aim of minimising power loss when a secondary axle drive wheel is decoupled from the flow of drive power by means of the clutch device.

SUMMARY

Accordingly, a de-oiling device is provided that de-oils the clutch space when the oil-delivering device is not delivering oil.

The use of such a de-oiling device has the result that, when the clutch is opened to decouple a drive wheel from the flow of drive power and does not transmit any drive power to a drive wheel, oil is actively conveyed out of the clutch space by the de-oiling device, so that the clutch device can rapidly run dry. In a clutch that has run dry, no liquid friction can occur between the inner and outer discs of a multiple disc clutch, so that the problems described above with regard to the prior art are circumvented.

The de-oiling may be an active de-oiling process, that is, a de-oiling process that is actively promoted or compelled by a driven device, and not just, for example, gravity-induced draining of a quantity of oil.

The de-oiling device may be formed by one or a plurality of components of the clutch device, e.g., e.g., by the drive members on the drive side of the clutch device, which convey oil into an oil pan when the clutch is opened in order to decouple secondary axle drive wheels from the flow of drive power. This simplifies designs and solutions for rapid de-oiling of the clutch space, with which additional de-oiling pumps or the like are unnecessary. The outer disc carrier of the clutch device, which is formed as a multiple disc clutch, is advantageously provided as a component of the de-oiling device.

The clutch assembly may be a component of an equalisation unit for the drive train of a motor vehicle, which has a continuously driven primary axle and a secondary axle which can be optionally engaged, wherein the clutch device is used to decouple secondary axle drive wheels driven by the secondary axle from the flow of drive power, and wherein the equalisation unit has a differential gear, which acts in a form-fitting manner and via which the drive power is transmitted to the secondary axle drive wheels when the secondary axle is integrated in the flow of drive power. In this case a first form-fitting or frictional clutch device is provided on the first output side of the differential gear, which device is coupled to a first secondary axle drive wheel. On the second output side of the differential gear, either no further second clutch device is provided, or a second form-fitting or frictional clutch device is provided. The second output side of the differential gear is therefore connected either directly, without an interposed second clutch device, to a second secondary axle drive wheel or indirectly, with the interposition of a second clutch device, to a second secondary axle drive wheel.

If the first clutch device on the first output side is then opened, drive power is no longer transmitted via either secondary axle drive wheel. The second secondary axle drive wheel, however, still rolls on the road, and the rotary movement thereof is transmitted into the differential gear if there is no second clutch device, or if a second clutch device is present but is not open. Owing to the typical construction of a conventional differential, this rotary movement is transmitted as far as the drive members of the open first clutch device on the drive side of the first clutch device when the input-side drive members of the equalisation unit, and of the clutch device (e.g. Cardan shaft, bevel wheel, differential case, crown wheel), are stationary or merely dragged, a change in rotation direction taking place in the differential gear itself. Because, however, the drive members on the drive side of the first clutch device may be used as components of the de-oiling device, the change in rotation direction does not constitute a problem, because when the first clutch device is open, the drive members used as components of the de-oiling device can no longer convey oil into an oil pan that is designed to collect the oil when the rotation direction is reversed, that is, when the secondary axle is engaged.

In order to allow rapid de-oiling of the clutch space even in the event of the described change in rotation direction of the drive members on the drive side of a first clutch device, when the secondary axle is decoupled from the flow of drive power and when the oil-delivering device does not deliver any oil because of the clutch device being open for this reason, a first oil pan is provided, e.g., in the part of the housing forming the clutch space. The de-oiling device therefore conveys the oil withdrawn from the clutch space for the purpose of de-oiling the clutch space into the oil pan when the secondary part of the drive train is decoupled from the flow of drive power. The clutch space is thus de-oiled immediately after the secondary part of the drive train is disengaged, and when the oil-delivering device is immobilised as a result. The clutch device rapidly runs dry and the disadvantages of the prior art described above do not exist.

In order to ensure sufficient de-oiling when the secondary part of the drive train is not decoupled from the flow of drive power, that is, when the clutch device is closed or at least transmitting torque, the housing forming the clutch space may have a second oil pan, into which the de-oiling device delivers the oil withdrawn from the clutch space for the purpose of de-oiling the clutch space when the secondary axle is integrated into the flow of drive power.

The oil is therefore collected either by the first or second oil pan and conducted via a first, and where necessary a second, de-oiling line, into which the respective oil pan opens, into an oil reservoir, which may be arranged at a distance from the clutch device. An oil reservoir is at a distance from the clutch device if the drive members of the clutch device are not in the oil reservoir, whether the secondary axle drive train is engaged or decoupled. To this end, the oil reservoir can either be separated from the clutch space by means of a housing wall or another partition in such a manner that the clutch space can run dry despite the high oil level in the oil reservoir, or the oil reservoir is arranged such that the oil level thereof can be permanently below the clutch assembly.

The clutch assembly may be provided as an assembly of a clutch-controlled equalisation unit, with or without a differential, that forms part of a secondary part of the overall drive train, which can be decoupled. If the oil-delivering device is coupled to a drive member on the drive side of the clutch device, e.g., to the clutch input shaft on the drive side of the clutch device or the drive-side disc carrier, the decoupling of the secondary part of the drive train, which is effected by the opening of the clutch device, among other things, also results in the interruption of the oil delivery by the oil-delivering device.

The preferred coupling of the oil-delivering device to a drive member on the drive side of the clutch device can be made in different ways. Either the oil-delivering device is arranged directly on a drive member of the drive train, or is formed by the drive member itself, as is the case, for example, when an oil-delivering wheel is used, the oil-delivering wheel being arranged directly on the drive-side shaft, or on a differential case. Such an oil-delivering wheel can, for example, be formed by the crown wheel that drives the differential case. Alternatively, the oil-delivering device may be driven indirectly, that is, with the interposition of further components, which transmit the drive power necessary for the oil-delivering device from the drive-side drive member to the oil-delivering device.

The oil-delivering device may be arranged at a distance from, i.e., separately from, the clutch device, e.g., not formed directly by an outer disc carrier of a clutch device formed as a multiple disc clutch. The arrangement of the oil-delivering wheel at a distance from the clutch device means that the oil can always flow into an oil reservoir at a distance from the clutch device or from the clutch space and/or separated by a partition after flowing through the clutch device to be oiled, and before the oil is fed back into the oil circuit. This ensures sufficient mixing of the entire oil volume and as a result the utilisation of the maximum cooling effect of the total quantity of oil at all times, which in turn reduces the thermal load on the clutch devices.

This configuration also makes it possible to configure an oil-delivering device, which rotates on a same geometric axis as the clutch device, for example the crown wheel, such that it can deliver the cooling and lubricating oil from an oil reservoir having an oil level below the clutch device. The clutch device, that is, e.g., also the dragged clutch components, can thus be situated permanently above the oil level, and the clutch device can rapidly run dry. Even components dragged continuously by the rolling drive wheels cause no friction losses, e.g., no splash losses or losses owing to hydrodynamic friction effects, when the clutch is open, that is, when the secondary part is disconnected.

If the oil-delivering device has an oil-delivering wheel that is formed at least partially by a crown wheel arranged on the drive-side shaft, the crown wheel itself may not have a sufficient diameter, owing to the dimensioning of the crown wheel, to dip into an oil reservoir situated below the clutch device. The oil-delivering wheel can then comprise the crown wheel arranged on the drive-side shaft, the crown wheel being extended radially outwards, for example by means of an oil-delivering ring. This radial extension can be formed as an integral, single-piece component of the crown wheel. For reasons of cost and weight, and to keep the masses to be accelerated and braked low, it is however practical to manufacture the radial extension, e.g., the oil-delivering ring, as a separate component of a lighter material, and to connect it to the crown wheel.

It is not strictly necessary to realise the oil-delivering wheel with the aid of a gearwheel of the differential gear situated within the power flow. An oil-delivering wheel that is separate from the crown wheel, but which preferably rotates on the same geometric axis as the clutch device, can also be provided.

Further disclosed herein is the use of a de-oiling device as described above and below in a clutch assembly forming part of a clutch-controlled equalisation unit with or without a differential, in which the rotary decoupling of the drive-side and output-side shaft is necessary for operation with an open clutch. For example, vehicles having a clutch-controlled, differential-free equalisation unit instead of a conventional equalisation unit, and/or vehicles in which a secondary part of the drive train, which can be included in the flow of drive power optionally in what is known as disconnect operation, is provided for optional operation of the vehicle with all-wheel drive may be equipped with such an equalisation unit.

An equalisation unit, a component of which may be the clutch assembly, can be either a transverse or a longitudinal equalisation unit. In a transverse equalisation unit, e.g., in a differential-free transverse equalisation unit operating purely frictionally, the side shafts of the drive wheels are coupled to the flow of drive power by means of side shaft clutches. The disclosed subject matter may alternatively or additionally be used in the context of conventional longitudinal and transverse differentials operating in a form-fitting manner, in order to oil clutch packs of the differential locks.

BRIEF DESCRIPTION OF THE DRAWINGS

Further features and advantages of the present disclosure can be found in the subclaims and the description of preferred exemplary embodiments using the drawings below.

In the drawings.

DETAILED DESCRIPTION OF EXEMPLARY EMBODIMENTS

Figure 1A:
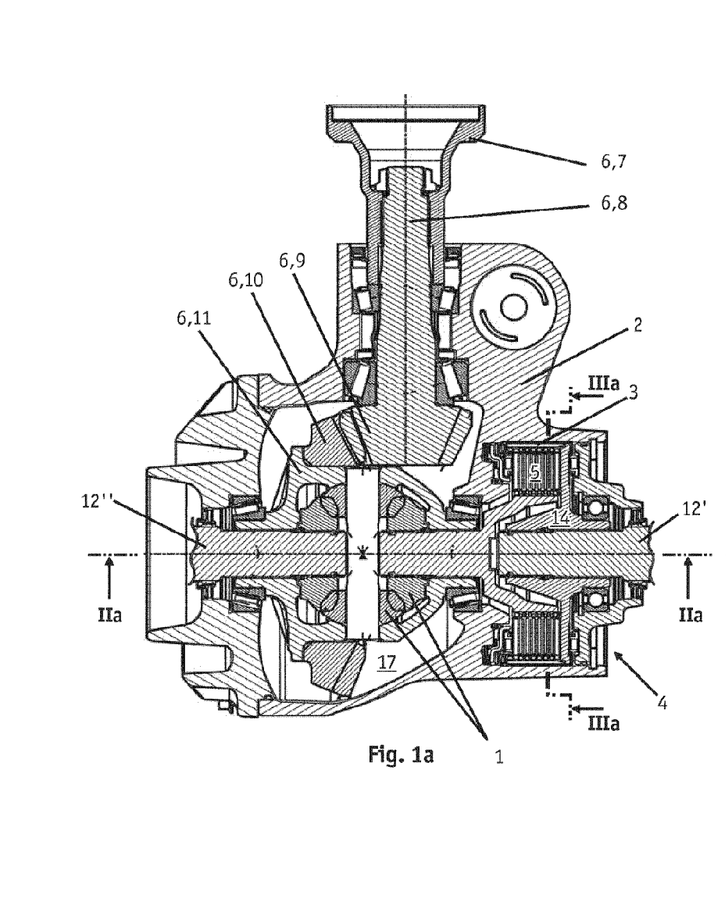
FIG. 1a shows a first configuration of a transverse equalisation unit of a drive train having a clutch assembly in cross-section.
Figure 1B:
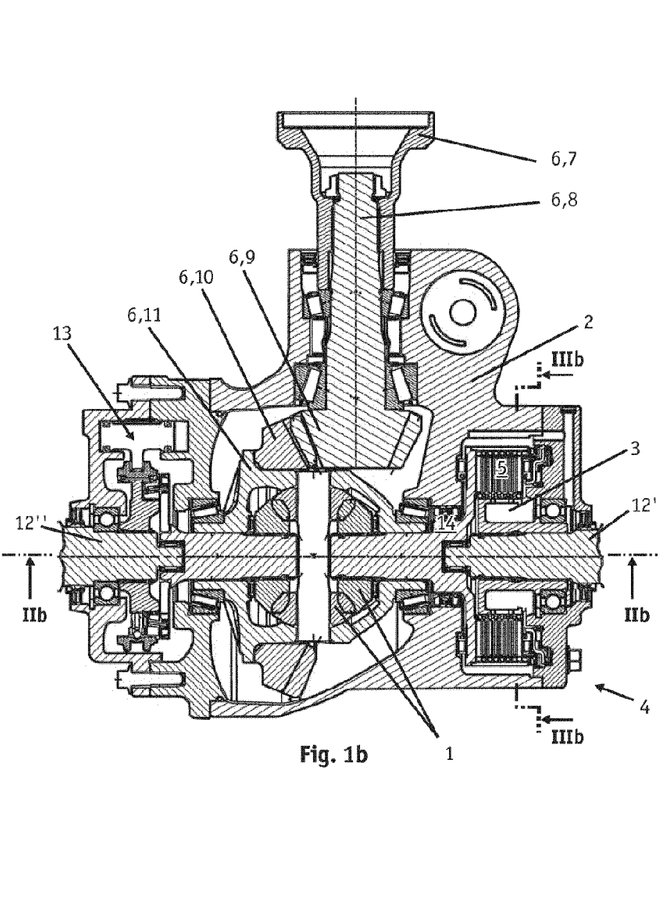
FIG. 1b shows a second configuration of a transverse equalisation unit of a drive train having a clutch assembly.

FIG. 1a and FIG. 1b show a transverse equalisation unit of a drive train, the basic construction of which is known in principle from the prior art. The equalisation unit has, on one side of a differential gear 1, by way of example on the right-hand side of the differential gear 1 in the figures, a clutch assembly 4, which is arranged in a clutch space 3 formed by a housing 2. A multiple disc clutch 5 is part of the clutch assembly 4. The drive power is transmitted via a chain from input members 6 of the equalisation unit (Cardan shaft flange 7, bevel wheel shaft 8 with bevel wheel 9, crown wheel 10, differential case 11 are shown, among others) into the differential gear 1. From there, the drive power is transmitted in a manner known in principle via the clutch assembly to the side shafts 12' and 12".

The equalisation unit is part of a secondary part of a drive train having a continuously driven primary part and a secondary part that is only driven if required. To this end, the secondary part of the drive train can be decoupled from the flow of drive power by means of decoupling devices when the vehicle is not to be driven in all-wheel mode, but merely by means of the primary axle (not shown). The number of components of the secondary part of the drive train that still rotate despite the immobilisation of the secondary part, for instance because they are dragged with power losses by the wheels rolling on the road, or from the primary axle side even if the secondary axle drive train is not integrated into the flow of drive power, should be kept as low as possible.

For the purpose of decoupling the secondary part, the clutch device, which is shown by way of example as a multiple disc clutch 5 in the figures, is opened so that the side shaft 12' connected thereto is removed from the flow of drive power. Because of the interposed differential gear 1, which no longer transmits torque because of the open clutch 5, drive power is no longer transmitted via the opposite side shaft 12". Moreover, the input members 6 of the equalisation unit are braked by a braking device (not shown), so that the chain of the input members 6 of the equalisation unit are also immobilised. In order to be able to brake the input members, a power take-off unit PTU (not shown), which decouples the input members of the equalisation unit from the primary axle side, is provided, preferably on the primary axle side. The result of this decoupling of the secondary part of the overall drive train is its substantial immobilisation.

The above explanations apply equally to the equalisation units shown in FIG. 1a and FIG. 1b. The difference between the equalisation units shown in the two figures lies in equalisation unit side that lies opposite the clutch device 5. In the equalisation unit shown in FIG. 1a, the side shaft 12" is coupled fixedly to a drive wheel so that the side shaft 12" continues to rotate continuously, owing to the wheel rolling on the road when the clutch device 5 is open. This rotation is transmitted continuously into the differential gear 1 during driving operation, so that the gearwheels thereof likewise rotate continuously. In the equalisation unit shown in FIG. 1b, an additional decoupling device 13 (in this case formed by way of example by a hydraulically actuated dog clutch that acts in a form-fitting manner), is provided on the side opposite the clutch device 5, by means of which decoupling device the differential gear can also be decoupled, so that even the differential gear can be completely immobilised when the secondary part of the drive train is decoupled.

This additionally provided decoupling device 13 for the side shaft 12" has no essential significance for the further disclosure provided below. In the sectional view IIb-IIb shown in FIG. 2b, the representation of the decoupling device is therefore omitted.

Experiments with the equalisation units known from the prior art have also shown that, even if the secondary part of the drive train is decoupled from the primary part, e.g., if it is decoupled during driving and at speeds upwards of approximately 50 km/h, the drive members of the secondary part, that is, the drive members on the drive side of the clutch device, are not immobilised as desired but continue to rotate owing to the drag power introduced into the clutch device by the secondary drive wheels and thus cause power loss. This is attributable to the oiling concept chosen in the prior art, as described above. The further figures show further features of the construction of the equalisation units shown in FIGS. 1a and 1b, which contribute to the elimination of the said disadvantages, e.g., owing to efficient clutch space de-oiling.

For example, in the configuration shown in FIG. 1b, in which the drive member on the drive side of the clutch device 5 is formed by the outer disc carrier, note that the rotation direction of the drive members on the drive side of the clutch device changes when the secondary part of the drive train is disengaged or decoupled, e.g., when the clutch device 5 is opened. This is because, for example, the outer disc carrier 14 rotates in the opposite rotation direction to the rotation direction that it would have during regular forward driving of the vehicle with the clutch device 5 closed owing to the interposed differential gear 1, and owing to the fact that the secondary axle drive wheel arranged on the left-hand side shaft 12" transmits its rotary movement to the side shaft 12" and into the differential gear 1. Depending on whether the clutch 5 is open, and the secondary part of the drive train is decoupled from the flow of drive power and the primary part, or whether the clutch 5 is closed and the secondary part of the drive train is included in the flow of drive power, the outer disc carrier on the drive side of the clutch device rotates in different directions. As a result, an oil pan as disclosed in EP 2 116 411 A1 mentioned in the introduction, would no longer be able to collect oil, as it is only configured for collecting oil with the rotation direction produced when the secondary part of the drive train is integrated in the flow of drive power owing to the closed clutch.

Figure 2A:
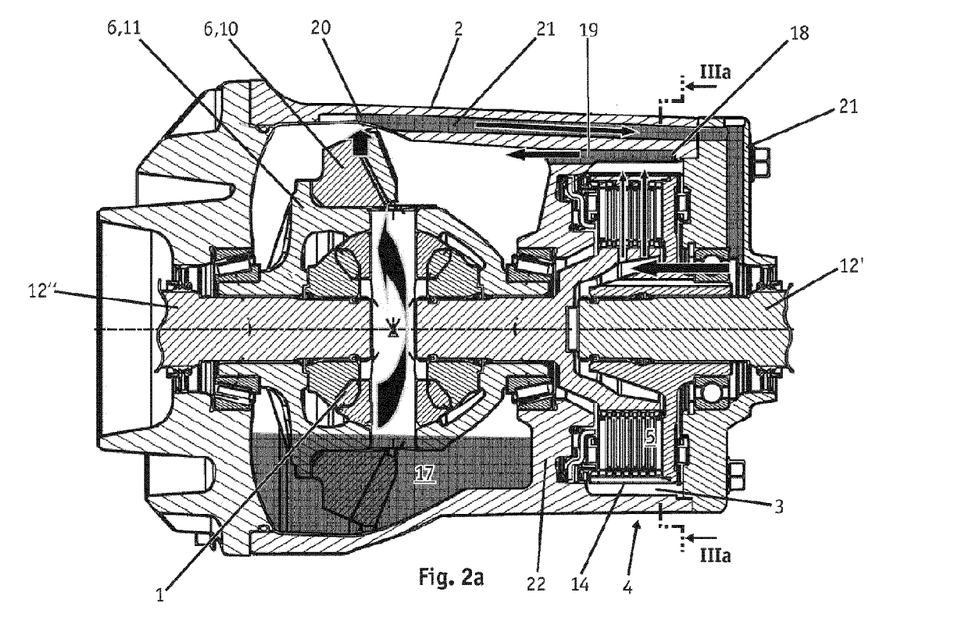
FIG. 2a shows the transverse equalisation unit of FIG. 1a in section along section line IIa-IIa.
Figure 2B:
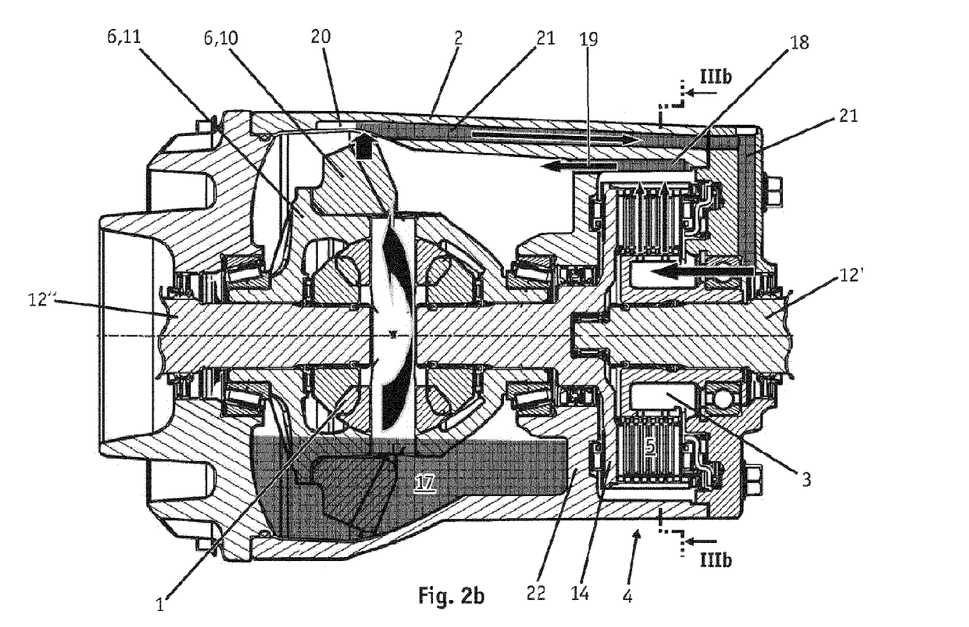
FIG. 2b shows the transverse equalisation unit of FIG. 1b in section along section line IIb-IIb.

FIGS. 2a and 2b illustrate the oil-delivering device for clutch oiling and that of the clutch space de-oiling system. Both configurations, which show the operation with the clutch device 5 closed, and thus with the secondary part of the drive train integrated into the flow of drive power, have in common that an oil-delivering device delivers oil into an oil collection pocket 20, which is provided in the differential housing. The oil flow is indicated by the arrows. When the secondary axle is connected, the crown wheel 10 scoops the oil owing to its rotation along the housing inner wall to an oil collection pocket 18 provided in the housing 2. The oil passes via an oil supply channel 21 via an open rotary bearing into the clutch space 3, and via radial bores provided in the inner disc carrier to the clutch device 5 or to the clutch discs.

It can be seen that the oil reservoir 17, indicated by the grey area in the housing 2, is separated from the clutch space 3 by a partition 22, so that the clutch space 3 can be de-oiled despite an oil level that is higher than the clutch members.

Compared to a solution in which drive members of the clutch device 5, e.g., a disc carrier and the discs themselves, primarily deliver the oil, the use of the crown wheel 10 as the oil-delivering device makes it possible for the oil flowing back from a clutch device to collect in an oil reservoir arranged at a distance from the clutch space and thus to mix with all the remaining oil volume before it is fed back to the oil circuit. A situation is avoided in which an inner oil circuit forms, as a result of which the oil is fed directly back to the clutches after having flowed through them, so that the oil would be over-proportionately heated as a result.

If the partition 22 shown in the figures is to be omitted, the differential housing 2 can be arranged such that the oil level in the oil reservoir lies below the clutch device whether the secondary part of the drive train is engaged or decoupled, because the clutch device does not have to dip into the oil reservoir for delivery of the oil. This also contributes to the minimisation of power loss, because the clutch members dragged by the side shafts do not have to be in the oil and thus cannot convey oil between the clutch discs. When the secondary part of the drive train is decoupled from the primary part, the clutches can therefore run completely dry and thus rotate in a friction-minimised manner, even with a differential housing arranged in this manner.

Figure 3A:
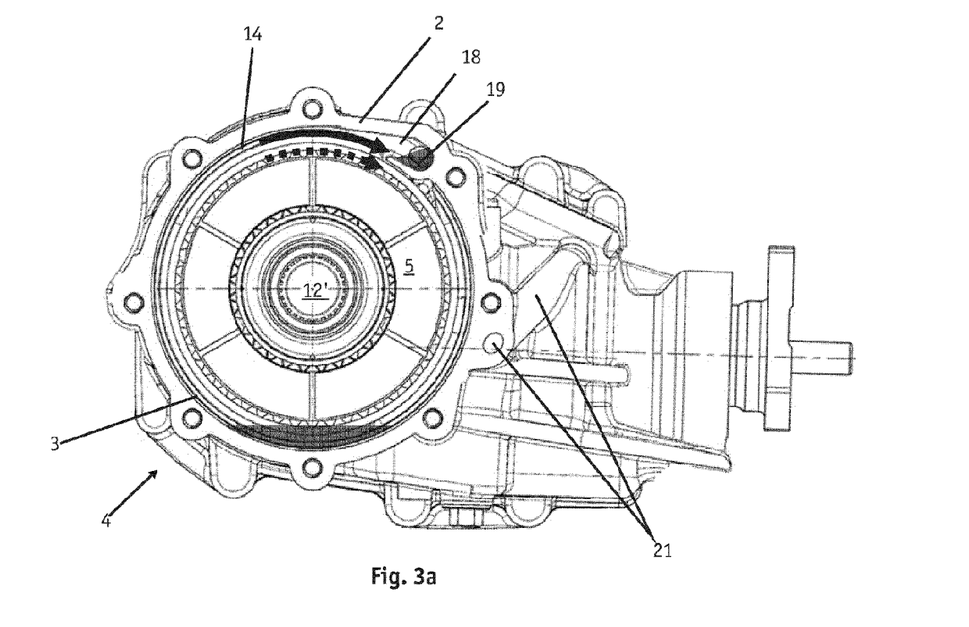
FIG. 3a shows the transverse equalisation unit of FIG. 1a along section IIIa-IIIa.
Figure 3B:
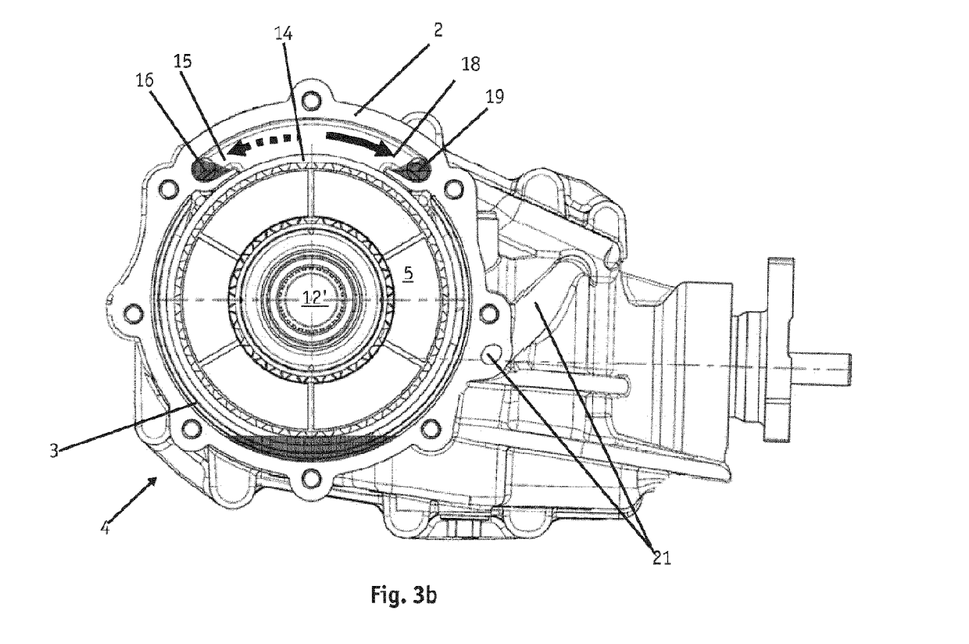
FIG. 3b shows the transverse equalisation unit of FIG. 1b along section IIIb-IIIb.

In order to solve the problems of insufficient clutch space de-oiling and insufficient dry running mentioned in the introduction, solutions shown in FIGS. 3a and 3b may be provided.

For example, for the case described previously in connection with FIGS. 1b and 2b, where the outer disc carrier forms a drive member on the drive side of the clutch device, in addition to a second oil pan 18, which receives the oil when the secondary axle is engaged, and thus when the oil-delivering device delivers oil and delivers it via a second de-oiling line 19 into an oil reservoir 17 provided at a distance from the clutch assembly and from the clutch space, an additional first oil pan 15 is provided, which is intended to receive the oil thrown off by the outer disc carrier 14 and is configured in such that it can receive the oil thrown off by the outer disc carrier 14 when the rotation direction of the drive members on the drive side of the clutch device 5 changes as a result of the clutch device 5 opening. The oil thrown off in this case is supplied to the oil reservoir 17 via a first de-oiling line 16. Because, when the clutch device 5 is open and the drive train is immobile, the crown wheel 10 preferably acting as the oil-delivering device is likewise immobile and thus the oil-delivering device does not deliver any oil that could run into the clutch space, the clutch space 3 is rapidly de-oiled.

In FIGS. 3b and 3a, the rotation direction of the outer disc carrier 14 with the clutch 5 closed (secondary part of the drive train engaged) is indicated with a solid arrow. The rotation direction of the outer disc carrier with the clutch 5 open (secondary part of the drive train decoupled) is shown as a dashed arrow.

It is significant for the previously explained configuration of an equalisation unit according to FIGS. 1a and 2a that the outer disc carrier 14, which may be used to de-oil the clutch space 3 is, in contrast to FIGS. 1b, 2b and 3b, a drive member on the output side of the clutch device 5, that is, is arranged on the wheel side and not, as in FIGS. 1b, 2b and 3b on the differential side or on the drive side of the clutch 5. The outer disc carrier therefore rotates as well during forward driving of the motor vehicle, because it is dragged by the secondary drive wheel rolling on the road irrespective of whether the clutch 5 is open or closed. If the clutch 5 is opened to decouple the secondary part of the drive train, the clutch space is rapidly de-oiled by the continuously rotating outer disc carrier 14, which delivers any oil still present into the second oil pan, and rapidly runs dry. In this case a first oil pan, which can collect oil when the rotation direction is reversed, is not necessarily provided in addition to the second oil pan 18.

The decoupling device 13 additionally provided in the configuration of an equalisation unit according to FIG. 1b has only an indirect influence on the de-oiling of the clutch space. In order to be able to realise this de-oiling in the equalisation unit shown in FIG. 1b, in which the differential gear 1 and the drive members connected thereto on the drive side of the clutch device 5, including the outer disc carrier 14, are immobilised when the additional decoupling device 13 is opened, the opening of the additional decoupling device 13 when the secondary axle drive train is decoupled takes place after the opening of the clutch device 5, so that the rotation direction of the drive members on the drive side of the clutch device 5, including the outer disc carrier 14, is reversed at least until sufficient de-oiling of the clutch space has been achieved.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A clutch assembly for inclusion in a motor vehicle, comprising:
    a clutch device arranged to be engaged and disengaged, and to transmit drive power from a first drive member to a second drive member, the first drive member being on a drive side of the clutch device and the second drive member being on an output side of the clutch device, wherein the clutch assembly is mounted in a housing that forms a clutch space arranged to accommodate the clutch device;
    an oil-delivering device arranged to deliver oil of an oil circuit serving the clutch device depending on an operating state; and
    a de-oiling device that is arranged to de-oil the clutch space when the oil-delivering device does not deliver oil;
    wherein a first oil pan is arranged so that the de-oiling device can deliver oil withdrawn from the clutch space to de-oil the clutch space when the oil-delivering device does not deliver oil; and
    further wherein a second oil pan is arranged so that the de-oiling device can deliver oil withdrawn from the clutch space to de-oil the clutch space when the oil-delivering device delivers oil.

2. The clutch assembly of claim 1, wherein one or more components of the clutch device are part of the de-oiling device.

3. The clutch assembly of claim 2, wherein a disc carrier of the clutch device that is formed as a multiple disc clutch is arranged to operate as a component of the de-oiling device.

4. The clutch assembly of claim 1, wherein drive members which are on the drive side of the clutch device are arranged to deliver oil into an oil pan to de-oil the clutch space when the clutch device is opened to decouple a wheel from a flow of drive power.

5. The clutch assembly of claim 1, wherein the clutch assembly is a component of an equalization unit for a drive train of the motor vehicle, the drive train having a continuously driven primary axle and a secondary axle that can be selectively engaged, wherein the clutch device is used to decouple secondary axle drive wheels driven by the secondary axle from a flow of drive power, and further wherein the equalization unit has a differential gear that acts in a form-fitting manner, and further wherein the drive power is transmitted via the differential gear to the secondary axle drive wheels when the secondary axle is integrated into the flow of drive power.

6. The clutch assembly of claim 1, wherein the first oil pan opens into a de-oiling line arranged to conduct oil into an oil reservoir that is separate from the clutch device.

7. The clutch assembly of claim 1, wherein the oil-delivering device is formed by the first drive member which is separate from the clutch device.

8. The clutch assembly claim 7, wherein the drive member forming the oil-delivering device is an oil-delivering wheel that is a gear wheel integrated in a flow of drive power, wherein the oil-delivering wheel is arranged to deliver oil from at least one of an oil reservoir having an oil level below the clutch device and an oil reservoir that is separated from the clutch space by a partition.

9. The clutch assembly of claim 8, wherein the drive member forming the oil-delivering device is a crown wheel of an equalization unit.

10. The clutch assembly of claim 1,
    wherein the de-oiling device is arranged to de-oil the clutch space by actively conveying oil out of the clutch space when the oil-delivering device does not deliver oil.

11. A clutch assembly for inclusion in a motor vehicle, comprising:
    a clutch device arranged to be engaged and disengaged, and to transmit drive power from a first drive member to a second drive member, the first drive member being on a drive side of the clutch device and the second drive member being on an output side of the clutch device, wherein the clutch assembly is mounted in a housing that forms a clutch space arranged to accommodate the clutch device;
    an oil-delivering device arranged to deliver oil of an oil circuit serving the clutch device depending on an operating state; and
    a de-oiling device that is arranged to de-oil the clutch space when the oil-delivering device does not deliver oil;
    wherein the oil-delivering device is formed by the first drive member which is separate from the clutch device;
    wherein the drive member forming the oil-delivering device is an oil-delivering wheel that is a gear wheel integrated in a flow of drive power, wherein the oil-delivering wheel is arranged to deliver oil from at least one of an oil reservoir having an oil level below the clutch device and an oil reservoir that is separated from the clutch space by a partition; and
    further wherein the drive member forming the oil-delivering device is a crown wheel of an equalization unit.

12. The clutch assembly of claim 11, wherein the clutch assembly is a component of an equalization unit for a drive train of the motor vehicle, the drive train having a continuously driven primary axle and a secondary axle that can be selectively engaged, wherein the clutch device is used to decouple secondary axle drive wheels driven by the secondary axle from a flow of drive power, and further wherein the equalization unit has a differential gear that acts in a form-fitting manner, and further wherein the drive power is transmitted via the differential gear to the secondary axle drive wheels when the secondary axle is integrated into the flow of drive power.

13. The clutch assembly of claim 11, wherein a first oil pan is arranged so that the de-oiling device can deliver oil withdrawn from the clutch space to de-oil the clutch space when the oil-delivering device does not deliver oil.

14. The clutch assembly of claim 13, wherein the first oil pan opens into a de-oiling line arranged to conduct oil into an oil reservoir that is separate from the clutch device.

15. The clutch assembly of claim 11, wherein the de-oiling device is arranged to de-oil the clutch space by actively conveying oil out of the clutch space when the oil-delivering device does not deliver oil.

16. The clutch assembly of claim 15, wherein a second oil pan is arranged so that the de-oiling device can deliver oil withdrawn from the clutch space to de-oil the clutch space when the oil-delivering device delivers oil.

\* \* \* \* \*